United States Patent Office.

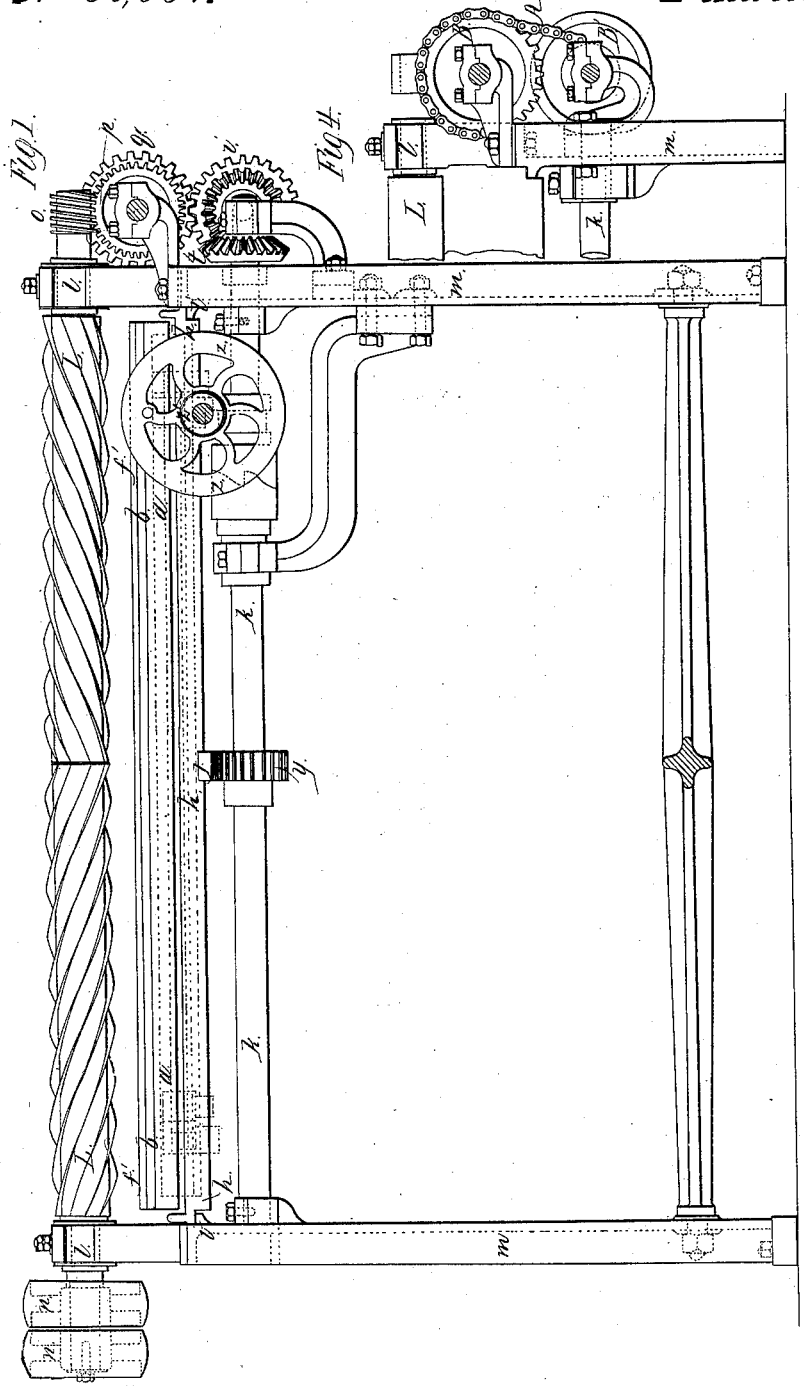

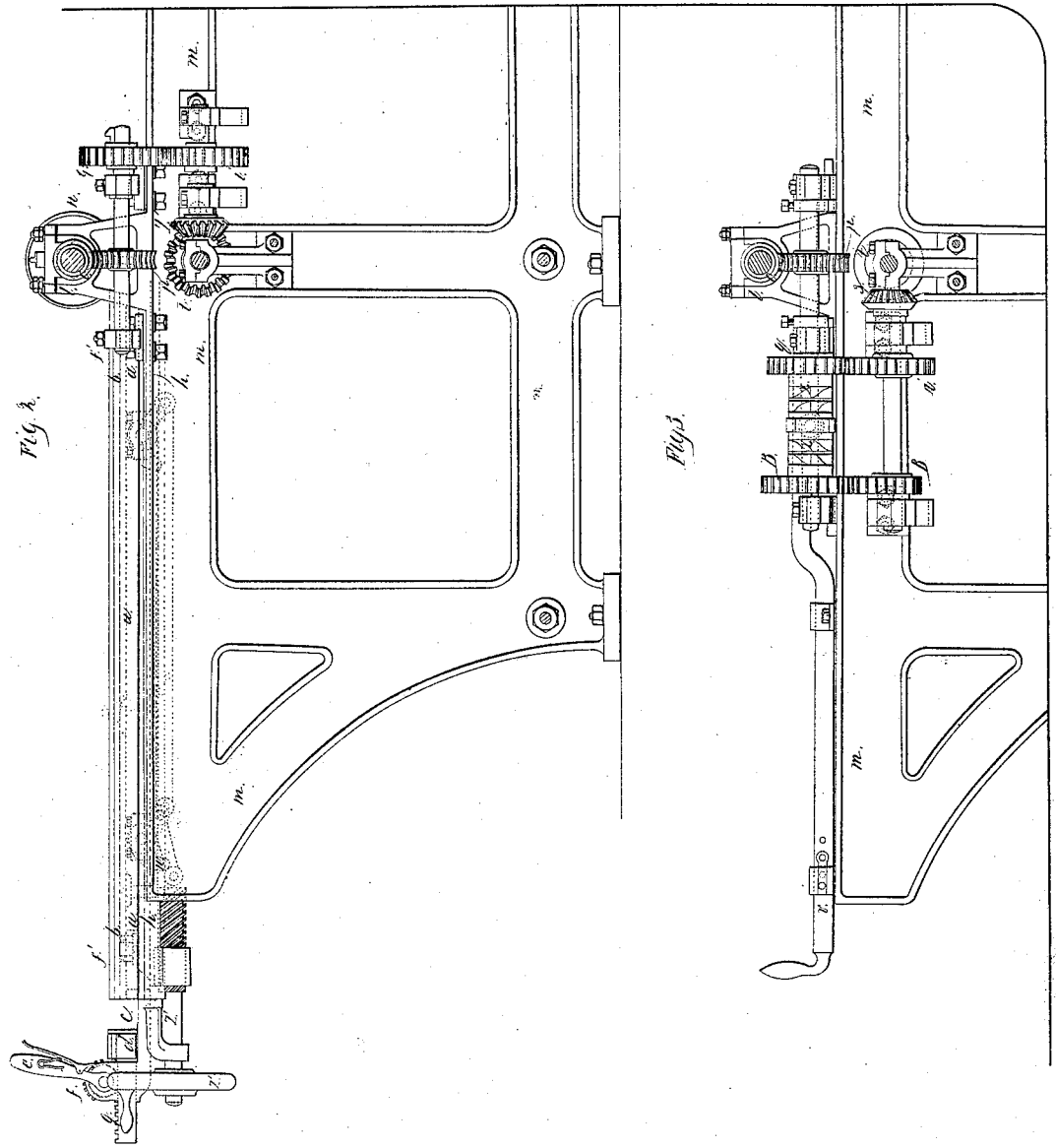

A. ADLER, OF PARIS, FRANCE.

IMPROVED APPARATUS FOR WORKING HIDES.

Specification forming part of Letters Patent No. 56,687, dated July 31, 1866.

*To all whom it may concern:*

Be it known that I, ANDRÉ ADLER, of Paris, in the Empire of France, have invented certain new and useful Improvements in Machines for Working and Preparing Skins; and I hereby declare the following to be a full, clear, and exact description of the same, reference being had to the accompanying drawings, in which—

Figure 1 is a front elevation of a machine constructed in accordance with my invention. Fig. 2 is a longitudinal or side elevation of the same; and Figs. 3 and 4 are elevations of apparatus for moving the carriages or frames of machines of large dimensions.

The machine is composed, as shown in the drawings, of a square frame, $a$, of such size that the skin to be dressed or worked may be spread upon it. This frame is of cast-iron or other metal, and is covered with a sheet of cork or vulcanized india-rubber, $b$, over which is placed a band of felt, which in turn is covered and held by cowhide prepared in alum.

The frame is furnished at one end with a clamp or holder, $c$, in which one end of the skin to be prepared is secured by means of the jaw $d$, worked by the handle $e$. On the shank of the handle is mounted a pinion, $f$, which moves a rack, $g$, and this in its turn causes the movement of the clamp $d$.

The frame $a$ is supported and held by flanges on a carriage, $h$, running on two parallel rails, $i$, and fitted with a rack, $j$, parallel to the rails, and gearing with a pinion, $y$, on the transverse shaft $k$.

The principal feature of the machine is the cylinder L, placed across the frame $a$ and supported in bearings in the brackets $l\ l$. This cylinder is provided or armed with blades, either edged or not, according to the particular operation to which the skin is to be submitted. These blades vary in number—say from eight to sixteen. They spring from the middle of the cylinder and pass around it spirally, half of them from right to left and the other half from left to right. This double direction of the blades or knives springing from the middle of the cylinder is of great importance, and forms the essential feature of the invention, for when the cylinder is put in motion the skin, while it is drawn forward, is at the same time stretched and made perfectly smooth, without a wrinkle, in all directions.

At one end of the cylinder L are the pulleys $n$, the one loose, the other fixed, to which motion is transmitted by means of a driving-band. The other end of the cylinder L is provided with an endless screw, $o$, which engages with the toothed wheel $p$. On the arbor of the wheel $p$ is mounted another wheel, $q$, which transmits motion to the toothed wheel $r$. The axis of this last wheel carries a conical pinion or miter-wheel, $s$, which engages with a like wheel, $t$, mounted on the end of the transverse shaft $k$.

Suppose that a skin to be prepared is placed on the frame $a$, and that one of its ends is held in the slide $c$, all recoil of the clamp $d$ is stopped by a ratchet-wheel, $u$. The pulley $n$, being put in motion, transmits its motion to the cylinder to which it is attached, and the carriage $h$, with its frame $a$, moves in a direction opposite to the rotation of the cylinder until the end of the carriage arrives underneath the cylinder. At this moment, by means of the lever $v$ and clutches $x$, Fig. 3, the pinion $y$ is disengaged from the rack $j$ and the motion of the frame is stopped. The attendant then turns the skin around, secures the other end thereof in the holder $c$, pushes back the carriage into the position it occupied at the commencement, re-engages the pinion $y$, and causes the movement to commence anew.

The frame $a$ rests on the carriage $h$ in a manner somewhat similar to a cover on a box, and may be raised to a certain height by turning a small wheel, $z$, whose shaft operates four cams, $w$, thus causing the frame to approach the cylinder more or less, at the pleasure of the operator.

In machines of large dimensions, in place of lowering the frame by hand, a jointed chain, A, Figs. 3 and 4, may be employed, which is rolled around two wheels, B B', in order to effect the automatic lowering of the frame.

The same machine may be used for cutting and splitting skins by placing in front of the blade-cylinder L stretching-cylinders, with a screw-thread in the same direction as the spirals of the blades, but of much less pitch. They should be furnished at their extremity with toothed pinions driven by a pinion on the axis of the blade-cylinder.

The blades, instead of being placed at right angles to the cylinder, are fixed parallel to the cylinder, so as to cut instead of scrape. The surface of the carriage in this case should be a plate of polished metal, and there should be four screws placed at the four corners of the frame in order to regulate the thickness to which the skin should be cut.

The blade-cylinder and the pinion in gear with the rack may be actuated separately and by distinct bands; and the rack may be worked by the shaft carrying the blades by means of an endless screw.

The machine described will do the work of four or five workmen, and it is managed with such facility and so little labor that even women or children may be employed to attend to it.

Having now described the nature of my invention, and the manner in which it may be carried into effect, what I claim, and desire to secure by Letters Patent, is—

The machine for working and preparing skins, constructed and arranged for operation substantially as herein set forth and described.

In testimony whereof I have signed my name to this specification before two subscribing witnesses.

A. ADLER.

Witnesses:
A. BLÉTRY,
E. ORT.